United States Patent [19]

Arditty et al.

[11] Patent Number: 5,009,504

[45] Date of Patent: Apr. 23, 1991

[54] MONOMODE OPTICAL FIBER RING INTERFEROMETRIC DEVICE WITH SEMICONDUCTOR DIODE AS LIGHT ENERGY EMISSION-RECEPTION/AMPLIFICATION MEANS

[75] Inventors: Hervé Arditty, Marly Le Roi; Hevré Lefevre, Paris, both of France

[73] Assignee: Thomson-CSF, Paris, France

[21] Appl. No.: 532,367

[22] Filed: Jun. 4, 1990

Related U.S. Application Data

[63] Continuation of Ser. No. 300,902, Jan. 24, 1989, abandoned, which is a continuation of Ser. No. 867,097, May 27, 1986, Pat. No. 4,842,409.

[30] Foreign Application Priority Data

May 30, 1985 [FR] France .................................. 85 08163

[51] Int. Cl.⁵ ................................................ G01B 9/02
[52] U.S. Cl. ....................................................... 356/350
[58] Field of Search ............................................ 356/350

[56] References Cited

U.S. PATENT DOCUMENTS 4,070,118 1/1978 Maslowski et al. ................. 356/237
4,480,915 11/1984 Arditty et al. ....................... 356/350

FOREIGN PATENT DOCUMENTS 2409518 6/1979 France .
56-151336 11/1981 Japan ................................... 356/73.1

Primary Examiner—Vincent P. McGraw
Attorney, Agent, or Firm—Oblon, Spivak, McClelland, Maier & Neustadt

[57] ABSTRACT

A ring interferometer device is provided comprising monomode optical fiber, a radiation separator and a mode filter coupled optically to a coherent light source. In a first approach, this source is a semiconductor diode of the type operating alternately as light emitter and receiver depending on the biasing. In a second approach, the source is a light emitting semiconductor diode coupled by its front face to the mode filter and by its rear face to a detector, said diode acting as light amplifier.

2 Claims, 3 Drawing Sheets

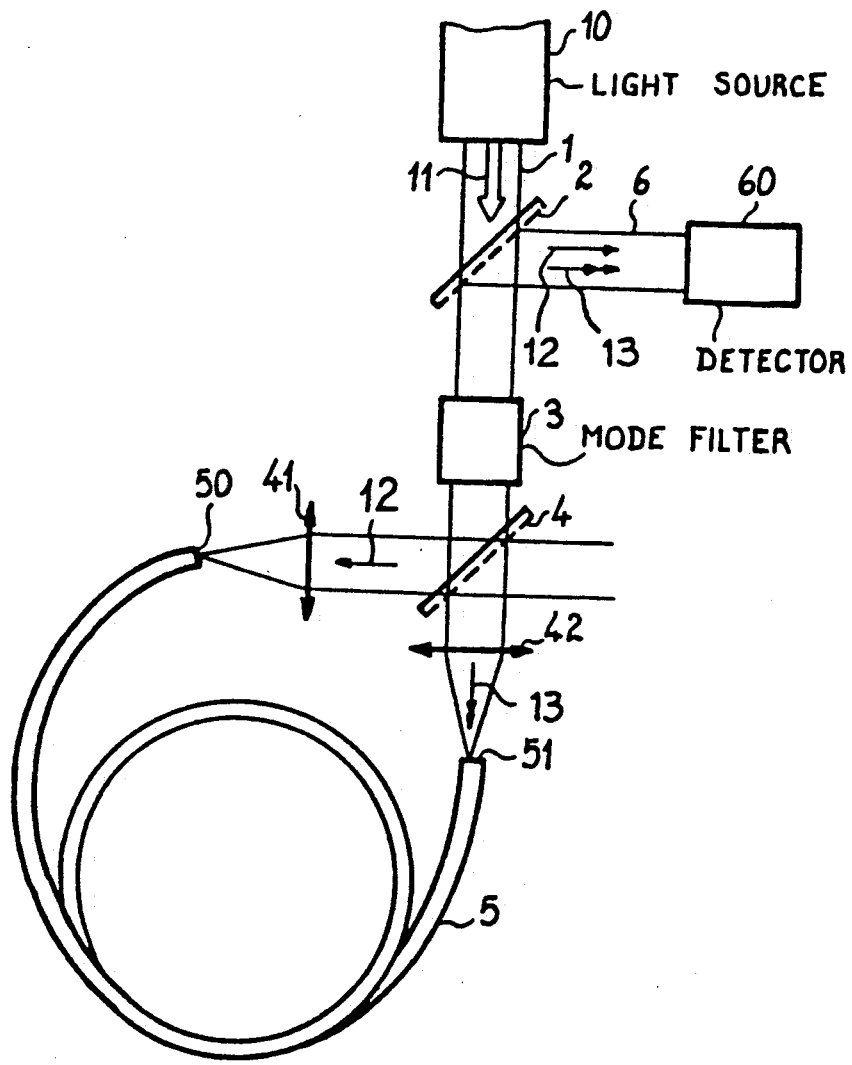
FIG_1 PRIOR ART

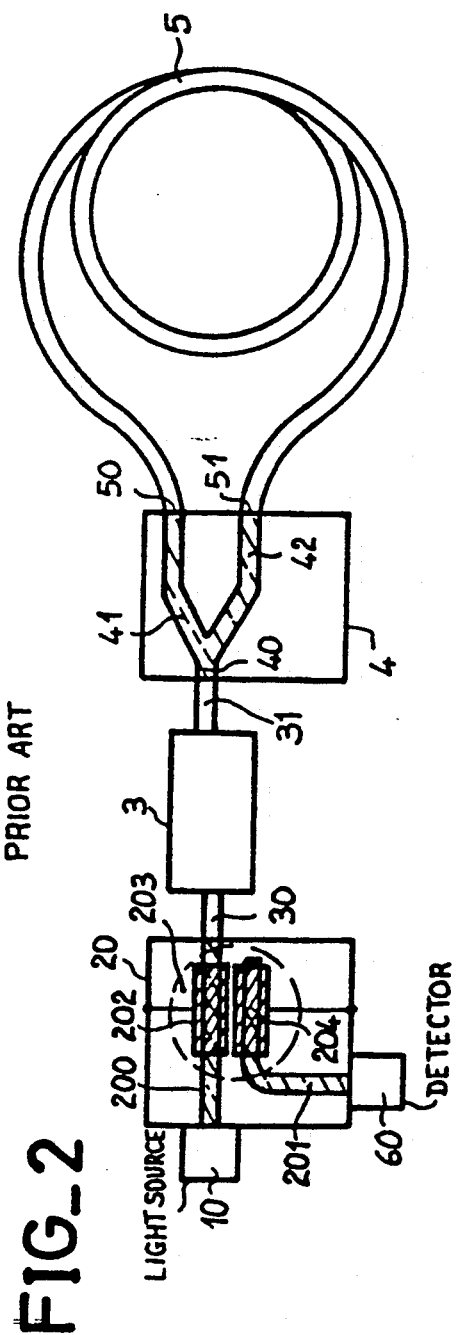

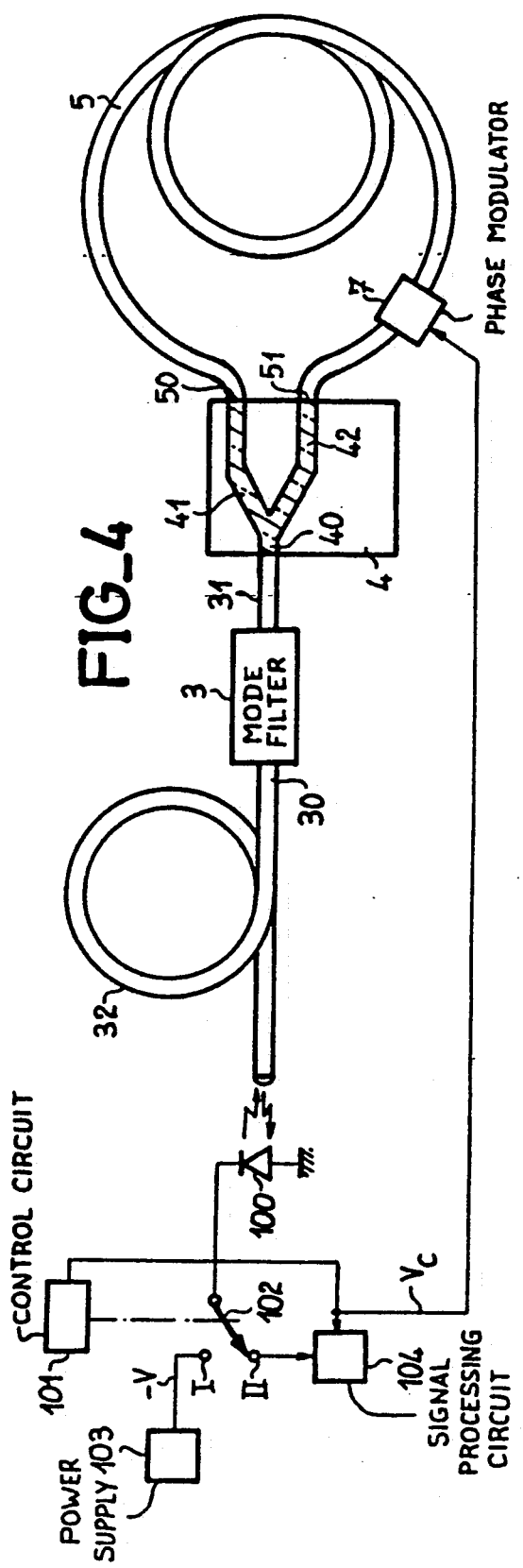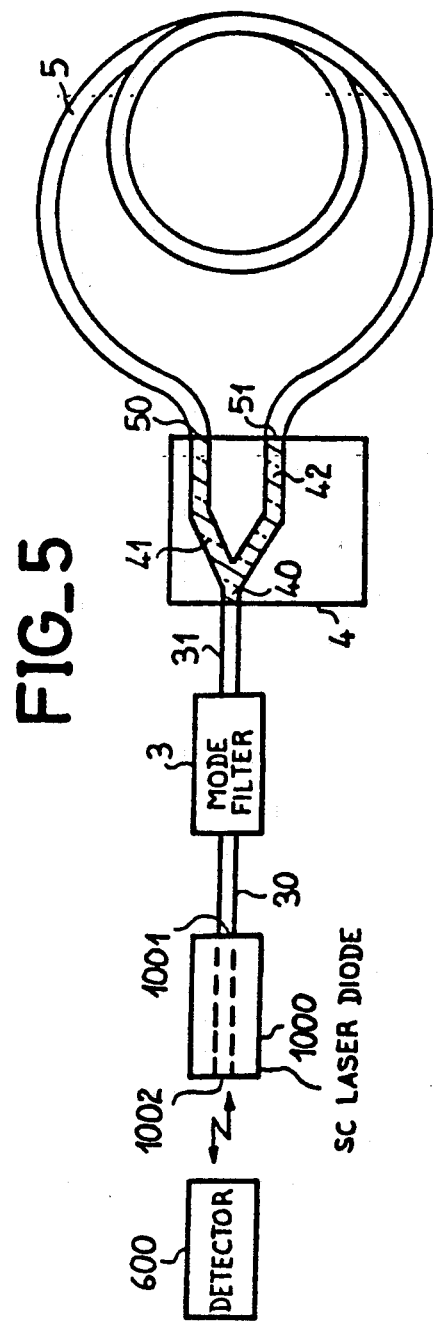

MONOMODE OPTICAL FIBER RING INTERFEROMETRIC DEVICE WITH SEMICONDUCTOR DIODE AS LIGHT ENERGY EMISSION-RECEPTION/AMPLIFICATION MEANS

This application is a continuation of application Ser. No. 07/300,902, filed on Jan. 24, 1989, now abandoned, which is a continuation of application Ser. No. 06/867,097, filed on May 27, 1986, U.S. Pat. No. 4,842,409.

BACKGROUND OF THE INVENTION

The present invention relates to a monomode fiber ring interferometric device.

In a ring interferometer, or Sagnac interferometer, two beams travel in opposite directions over the same optical path and interfere with each other at the exit from this path. As long as a disturbance of this path has the same characteristics for both directions of propagation and does not vary during the transit time of the light in the interferometer, the two beams are affected identically and their relative phase remains unchanged. Disturbances of this type are called "reciprocal". Because the transit time in an interferometer is generally very short, the variations of a disturbance during this time, unless it is introduced voluntarily, are generally negligible.

But there exist "non reciprocal" disturbances which have a different amplitude in the two directions of propagation, it is a question of physical effects which, by establishing its complete orientation, destroy the symmetry of the space or of the medium.

Two known effects have this property:
  the Faraday effect, or colinear magneto-optical effect, whereby a magnetic field creates a preferential orientation of the spin of the electrons of the optical material;
  and the Sagnac effect, or relativist inertia effect, where the rotation of the interferometer with respect to a Galilean reference destroys the symmetry of the propagation times.

The use of the rotation with respect to inertial space leads to the construction of optical fiber gyrometers or rate meters and the use of the magnetic field leads to the construction of amperometric current sensors or magnetometers.

It has been demonstrated that the use of a particular so called reciprocal configuration cancels out exactly any phase shift other than those induced by the non reciprocal effects.

This configuration however requires the light to be detected coming back through the monomode entrance gate of the interferometer. This requires using a separator which sends a part of the exiting light to a detector while coupling light at the entrance. The return signal to the detector is optimum when the separator is of the 50—50 type but that causes a systematic loss of 6dB and adds a component to the system. It has been proposed replacing the separator by a high speed switch which is placed in a first switching state when the light is emitted by the source and transmits it to the system at the entrance and which is placed in its other switching state when the light returns for sending it to the detector. Since the fiber lengths used in these systems are of the order of 200 meters to 2 kilometers, the delays due to the propagation are of the order of 1 to 10 microseconds.

Such a device is described in the French patent FR-B-2 409 518. The energy balance is improved, but the architecture of the device may be further simplified.

SUMMARY OF THE INVENTION

This is the aim sought by the invention. For this, it provides arrangements for suppressing the separator or the high speed switch.

The invention provides then a ring interferometer device comprising a monomode optical fiber forming said ring, coherent light energy emission-reception means, means for separating and mixing the radiation for directing simultaneously and in equal parts the coherent light energy emitted towards the two ends of the monomode optical fiber for recombining the radiation emerging from the two ends of the monomode optical fiber and a mode filter disposed between the separation and mixing means and the light energy emission-reception means, wherein said light energy emission-reception means are formed by a semiconductor diode which, biased in the forward direction, emits light of a given wave length and which, polarized in the reverse direction, is a detector of light of the same wave length; and further comprising means for biasing said diode in the forward direction so as to control the light emission, electric signal processing means, switching means and means for controlling the switching means, so as to establish alternately an electric connection between the semiconductor diode and, respectively, the biasing means in the forward direction and the electric signal processing means.

The invention further provides a ring interferometer device comprising a monomode optical fiber forming said ring, coherent light energy emission-reception means, means for separating and mixing the radiation so as to direct simultaneously and in equal parts the coherent light energy emitted towards the two ends of the monomode optical fiber and for recombining the radiation emerging from the two ends of the monomode optical fiber and a mode filter disposed between the separation and mixing means and said light energy emission-reception means, wherein said light energy emission-reception means comprise a coherent light emitting, semiconductor device optically coupled by a first face to the mode filter and optoelectronic detection means coupled optically to a second face of said light emitting semiconductor diode, said diode amplifying the light retransmitted to the emission-reception means for detection.

BRIEF DESCRIPTION OF THE DRAWINGS

The invention will be better understood and other characteristics and advantages will appear from the following description with reference to the accompanying Figures in which:

FIG. 1 illustrates schematically an interferometer of the prior art in one embodiment;

FIG. 2 illustrates schematically an interferometer of the prior art in a second embodiment;

FIG. 3 illustrates an interferometer in a first embodiment of the invention;

FIG. 4 illustrates a variant of an interferometer according to the first embodiment;

FIG. 5 illustrates an interferometer in a second embodiment of the invention.

FIG. 1 illustrates schematically a ring interferometer in a first embodiment.

DETAILED DESCRIPTION OF THE INVENTION

In this FIG. 1 is shown a ring interferometer whose ring is formed from a monomode optical fiber 5, but whose core is formed of traditional optical elements. The addition of a mode filter 3 makes such an interferometer strictly reciprocal.

The incident beam 11 produced by a laser source passes through a mode filter 3 and is separated in two by a semitransparent mirror 4. A part 12 of the beam is fed into the optical fiber through a lens 41 which focuses it on the input 50 of the optical fiber 5, whereas the other part 13 of the beam is fed to the same optical fiber 5 through a lens 42 which focuses it on the input 51 of this optical fiber 5. Both beams travel along the fiber in reverse directions and are taken up in the arm of the interferometer by the semitransparent mirror 4. They pass again through the mode filter 3 and are separated from the incident beam by a semitransparent mirror 2 which sends them partly into an output arm 6 in which the interference signal is detected by means of a photodetector 60.

The use of a monomode optical fiber 5 as optical path allows the length of this optical path to be very substantially increased. In fact, the optical fiber is usually wound so as to form a multiturn coil. Thus very sensitive gyroscopes may for example be formed.

However, the separator elements introduce losses, as was recalled above.

Thus, it has been proposed replacing the discrete elements by integrated optical elements which improves the energy balance.

FIG. 2 illustrates schematically a device of this type.

The device comprises a laser source 10, preferably a semiconductor laser. It also comprises a plate 20 formed by an electro-optical substrate on which wave guides 200 and 201 may be formed. The optical connections integrated on the substrate are then a first guide 200 picking up the radiation emitted by the laser 10, and a second guide 201 forming, with the first guide 200, a coupler 203. A detection device 60 is coupled to the end of guide 201. The coupler 203 formed of the two adjacent parts of guides 200 and 201 may be placed, either in a parallel state, the light guided through the guide 200 emerging through the same guide, or in a crossed state, whereby the light guided in guide 200 is coupled into guide 201. For that, two electrodes 202 and 204, between which an electric field may be applied, cover the parallel optical paths formed by the two adjacent parts of diodes 200 and 201. In the absence of a field, the coupler is in the parallel state and in the presence of a field, the coupler is in the crossed state. The field is applied during return of the light.

The device also comprises a second plate 4 formed by an electro-optical substrate on which has been integrated a symmetrical fork formed of two guides 40 and 41 coupled to an input guide 40 and intended to pick up respectively a half of the radiation guided by guide 40. The two ends 50 and 51 of the monomode optical fiber 5 forming the ring of the interferometer are coupled directly, without intermediate optics, to the two ends of guides 41 and 42.

One of the ends of guide 200, on plate 20, is coupled to an end of an intermediate monomode optical fiber 30 whose other end is coupled in its turn to a mode filter 3.

Similarly, one of the ends of guide 40 is coupled to a second intermediate monomode optical fiber 31 whose other end is coupled in its turn to the mode filter 3. This mode filter 3 may in its turn be formed by an integrated optical wave guide.

Naturally, other coupling modes may be adopted between the mode filter 3 and guide 40 on the one hand, 15 and guide 200, on the other.

The main elements of a device constructed with this approach are described in French patent FR-B-2 409 518.

The device then operates in the following way: the laser source 10 is modulated so as to emit light pulses of a duration less than the propagation time in the fiber. The coupler is in the parallel state during emission of the light pulses so that the light emitted by the laser is guided in guide 200; the energy is split up equally between the two guides 40 and 41 and is transmitted to fiber 5 where it propagates simultaneously in both directions. If the system is rotating at an angular speed ω, the two return pulses will be transmitted respectively to the guides 42 and 41 with a phase shift ΔΦ. The coupler is then placed in the cross state by application of an electric field and the light transmitted by guide 200 is transmitted to guide 201 and detected by detector 60.

Although forming an improved device in so far as the energy balance is concerned, this device is not optimized, it is in fact possible in particular to simplify the architecture of the device.

FIG. 3 illustrates a device in a first embodiment of the invention.

In the device illustrated in FIG. 3, we find again the ring formed by a monomode optical fiber 5, the two arm integrated optics light distributor 4, the intermediate monomode optical fibers 30 and 31 as well as the mode filter. The elements identical to those in FIG. 2 bear the same references and will not be described again.

According to the main feature of the first approach of the invention, the light source 100 is a semiconductor diode which may serve alternately as light emitter and receiver depending on the polarity of the electric power supply for this diode.

A certain number of semiconductor components offer this possibility, particularly semiconductor diodes of the "GaAlAs/GaAs" (Gallium-Aluminium-Arsenic/GalliumArsenic), "GaAlAs" (Gallium-aluminium-Arsenic) or "GaInAsP/InP" (Gallium-Indium-Arsenic-Phosohorous/Indium-Phosphorous) type. More particularly, in this latter case, it is a question preferably of laser diodes of a structure known under the abbreviation "TJS" ("Transverse Junction Stripe").

By way of one example among others, such a component is described in French patent FR-B-2 387 519.

In the emitting position, diode 100 is biased in the forward direction. For this, a switch 102 with two positions I and II, connects it to an electric energy source 103 (position I). In the example illustrated in FIG. 3, the cathode of the diode 100 is connected to a negative voltage $-V$ (forward direction) of sufficient amplitude for emitting the light energy required for the particular application. The duration of emission is dependent on the length of the optical path travelled over by the light, that is to say in the first place on the length of the optical fiber 5. As it was recalled, this length is in general in the range 200 meters to 2 kilometers. The light emitted is then retransmitted to source 100 after a time interval between 1 and 10 microseconds, for the above mentioned optical fiber lengths.

Switch 102 is actuated by a control circuit 101 so as to establish an electrical connection (position II) between diode 100 and a signal processing circuit 104, which circuit comprises the usual elements for this type of application, more particularly an electric signal amplifier.

In actual fact, switch 102 is an electronic member whose switching speed is compatible with the application and not an electromagnetic switch as shown schematically in FIG. 3.

The laser 100 used as detector has a very wide pass band but a problem exists concerning the relaxation time of the electrons excited when the component passes from the emission mode to the detection mode. The system must then be modulated with square waves with a period equal to double the transit time of the light in the ring interferometer.

The signal related to the phase shift in an a ring interferometer is generally detected with a phase modulation method. In this case, the frequency detected is equal to $\frac{1}{2} \tau$ where $\tau$ is the propagation time in the coil.

For this, the signal processing circuits comprise a quadratic type synchronous detector. A signal Vc at frequency $\frac{1}{2} \tau$, produced by the control circuits 101 is transmitted to the synchronous detector included in the signal processing circuits 104.

Moreover, at least one reciprocal effect phase modulator 7 is inserted in the modulator ring 5, which also receives the control signals Vc at frequency $\frac{1}{2} \tau$.

Such arrangements are described in the French patent application FR-A-2 471 583.

The phase modulator 7 brings into play a reciprocal effect: elasto-optical or electro-optical for example. Examples of such modulators are described in the above patent application. This modulator is excited so as to introduce a phase variation of the wave which travels through it which is periodic, the period being equal to a value $2 \tau$.

Because of the periodicity, the following relationship is confirmed:

$$\Phi(t) = \Phi(t + 2\tau) \quad (1)$$

$\Phi$ (t) being the function describing the variation of the phase as a function of time.

Each of the two waves travelling in opposite directions also undergoes this phase shift when it passes through the modulator. It follows that the phase difference, $\Delta\Phi$ in the absence of this phase shifter, becomes:

$$\Delta\Phi = \Delta\Phi + \Phi(t) - \Phi(t+\tau) \quad (2)$$

if we call $\psi(\tau)$ the following function:

$$\psi(t) = \psi(t) - \psi(t+\tau) \quad (3)$$

because of the periodicity of $\Phi(\tau)$, the function $\Phi(\tau)$ is symmetric, which means that:

$$\psi(t) = -\psi(t+\tau) \quad (4)$$

it follows that the optical power detected in each branch has a frequency spectrum representing the components of the optical power detected as a function of the frequency.

This spectrum can be broken down into:
a continuous component,
a component of frequency $\frac{1}{2} \tau$ proportional to sine ($\Delta\Phi$) or useful component,
a component of frequency $1/\tau$ proportional to Cos ($\Delta\Phi$),
different components at upper order harmonics, which harmonics depend on the exact form of the function $\Phi(\tau)$.

This latter function, representing the phase modulation of the waves travelling in opposite directions through ring 5 may have any form. However, functions such as those representing square or sinusoidal signals for example may have certain advantages. These advantages may be of several kinds: facility of generating such functions, breaking down into harmonics following a known spectrum or facility of being synchronized with such signals.

In a variant, not shown, two reciprocal effect phase modulators may also be provided, one at each end of ring 5 of the interferometer. Each modulator introduces a periodic phase shift as before, at frequency $\frac{1}{2} \tau$, but so that we have the relationship:

$$\Phi_1(t) = -\Phi_2(t) \quad (5)$$

$\Phi_1$ (t) being the phase shift caused by the first modulator and $\Phi_2$ (t) the phase shift caused by the second modulator. If the relationship (5) is substantially confirmed whatever the value of t, an additional gain in stability is obtained by this particular arrangement because of the symmetry.

The modulation frequency used for switching the source in the detector mode is $\frac{1}{2} \tau'$ where $\tau'$ is the propagation time of the light over the whole of the optical path, that is to say: path in ring 5 and outgoing - return path between source 100 and the separator 4 of the interferometer. If the travel time in ring 5 is much longer than this outgoing-return travel, these two frequencies are very close to each other and may produce a parasite beat in the detection band. The ideal solution is to have the switching frequency equal to twice the detection frequency. This is possible if the total travel time is equal to one and a half times the travel time in the coil. This implies using a delay line between the source and the separator. For this, an additional optical fiber is used providing a propagation delay. The length of optical fiber required is equal to a quarter of the length of the optical fiber 5 forming a ring.

FIG. 4 illustrates this variant. Apart from the elements common with FIG. 3, and which will not be described again, the device illustrated in this Figure comprises an optical fiber 32 forming a delay line in place of the optical fiber 30. All other arrangements may also be adopted: the optical fiber 32 may be substituted for the optical fiber 31.

In a second approach of the invention, the light source is also coupled optically to the mode filter 3 without any other intermediary except possibly an optical fiber as before. This source is used as light generator and as light amplifier. FIG. 5 illustrates this second approach. Source 1000 is a semiconductor laser diode preferably of type "GaAs" (Gallium-Arsenic) or a so called "superluminescent" diode. The front face 1001 of this diode or normal emission face is coupled optically, in the example illustrated, to an intermediate optical fiber 30. Its rear face 1002 is coupled to a conventional photodetector element 600, a "PIN" type diode for example.

The light retransmitted to the source passes through the laser diode 1000, is amplified during this passage and is detected in a usual way by the photodiode 600.

In both approaches, the high speed switch (FIG. 2: 20) or the separator (FIG. 1: 2) are suppressed.

What is claimed is:

1. A ring interferometer device comprising:
   a monomode optical fiber forming a ring;
   coherent light energy emission-reception means;
   means for separating and mixing the radiation for directing, simultaneously and in equal parts, the emitted coherent light energy to the two ends of the monomode optical fiber and for recombining the radiation emerging from both ends of the monomode optical fiber;
   a mode filter disposed between the separation and mixing means and the light energy emission-reception means;
   wherein said light energy emission-reception means are formed by a semiconductor diode which, polarized in the forward direction, emits light of a given wave length and which, polarized in the reverse direction, detects light of the same wave length; and further comprising
   means for biasing said diode in the forward direction for controlling the light emission thereof;
   electric signal processing means for obtaining a measurement of non-reciprocal effects from any phase shift indicated by an interference signal; and
   switching means and means for controlling said switching means, so as to establish alternately an electric connection between said semiconductor diode and respectively, the forward direction biasing means and the electric processing means, the switching means being switched from the emission mode to the detection mode at a period equal to double the transit time of the light in the ring interferometer.

2. The device according to claim 1, comprising:
   at least one reciprocal effect phase modulator controlled by a periodic signal of frequency $\frac{1}{2}$ t, where t is the time which a wave takes to travel the optical path defined by said ring; said electric signal processing circuits comprising a detector synchronous at the same frequency.

* * * * *